United States Patent [19]

Bander et al.

[11] 4,260,735

[45] Apr. 7, 1981

[54] CATALYTIC PROCESS FOR PREPARATION OF POLYESTERS

[75] Inventors: John A. Bander, Richmond; Stanley D. Lazarus, Petersburg; Ian C. Twilley, Chester, all of Va.

[73] Assignee: Allied Chemical Corporation, Morris Township, Morris County, N.J.

[21] Appl. No.: 120,804

[22] Filed: Feb. 12, 1980

[51] Int. Cl.$^3$ ............................................. C08G 63/34
[52] U.S. Cl. ........................................................ 528/279
[58] Field of Search .......................................... 528/279

[56] References Cited

U.S. PATENT DOCUMENTS

| | | | |
|---|---|---|---|
| 2,727,881 | 12/1955 | Caldwell et al. | 260/75 |
| 2,822,348 | 2/1958 | Haslam | 260/75 |
| 2,878,236 | 3/1959 | Young et al. | 260/78.3 |
| 3,047,515 | 7/1962 | Pürma | 260/2 |
| 3,056,817 | 10/1962 | Werber et al. | 260/404.8 |
| 3,056,818 | 10/1962 | Werber | 260/410.6 |
| 3,075,952 | 1/1963 | Coover et al. | 260/75 |
| 3,079,368 | 2/1963 | Lundberg | 260/75 |
| 3,245,959 | 4/1966 | Roeser | 260/75 |
| 3,299,004 | 1/1967 | Hartmann et al. | 260/75 |
| 3,321,444 | 5/1967 | Hoyer et al. | 260/75 |
| 3,346,541 | 10/1967 | Davies et al. | 260/75 |
| 3,389,127 | 6/1968 | Kresse et al. | 260/75 |
| 3,410,829 | 11/1968 | Jeurissen et al. | 260/75 |
| 3,441,540 | 4/1969 | Müller et al. | 260/75 |
| 3,453,241 | 7/1969 | Jeurissen et al. | 260/75 |
| 3,463,742 | 8/1969 | Bell et al. | 252/430 |
| 3,554,977 | 1/1971 | Carter et al. | 260/75 |
| 3,554,978 | 1/1971 | Carter et al. | 260/75 |
| 3,644,291 | 2/1972 | Price et al. | 260/75 R |
| 3,644,293 | 2/1972 | Fielder | 260/75 R |
| 3,658,760 | 4/1972 | Jeurissen et al. | 260/75 R |
| 3,734,891 | 5/1973 | Knopka | 260/75 R |
| 3,758,535 | 9/1973 | Vizurraga | 260/429.5 |
| 3,781,245 | 12/1973 | Itabashi et al. | 260/75 R |
| 3,817,931 | 6/1974 | Brooks | 260/75 R |
| 3,842,040 | 10/1974 | Browne et al. | 260/75 M |
| 3,842,041 | 10/1974 | Browne et al. | 260/75 M |
| 3,849,379 | 11/1974 | Jeurisson et al. | 260/75 M |
| 3,852,247 | 12/1974 | Vizurraga | 260/75 R |
| 3,870,688 | 3/1975 | Makimura et al. | 260/75 R |
| 3,907,754 | 9/1975 | Tershansy et al. | 260/75 R |
| 3,936,421 | 2/1976 | Hayashi et al. | 260/45.75 K |
| 3,940,367 | 2/1976 | Pelousek et al. | 260/45.95 R |
| 3,962,189 | 6/1976 | Russin et al. | 260/75 R |
| 3,965,071 | 6/1976 | McClelland | 260/75 R |
| 4,010,145 | 3/1977 | Russin et al. | 260/75 R |
| 4,011,193 | 3/1977 | Wambach | 260/40 R |
| 4,018,708 | 4/1977 | Vogt et al. | 252/431 C |
| 4,020,010 | 4/1977 | Vogt et al. | 252/431 C |
| 4,049,635 | 9/1977 | Cleary | 260/75 R |
| 4,056,514 | 11/1977 | Strehler et al. | 260/75 R |
| 4,066,627 | 1/1978 | Borman et al. | 260/75 M |
| 4,072,631 | 2/1978 | Vogt et al. | 252/431 R |
| 4,080,317 | 3/1978 | Morawetz et al. | 260/75 R |
| 4,115,371 | 9/1978 | Bier et al. | 528/279 |
| 4,128,533 | 12/1978 | Köhler et al. | 528/279 |
| 4,128,534 | 12/1978 | Köhler et al. | 528/279 |
| 4,131,601 | 12/1978 | Hashimoto et al. | 528/279 |
| 4,288,755 | 11/1966 | Griehl et al. | 260/47 |

OTHER PUBLICATIONS

Dupont Bulletin, Versatile Tyzor Organic Titanates, pp. 1-45.

*Primary Examiner*—Lucille M. Phynes
*Attorney, Agent, or Firm*—Richard A. Anderson

[57] ABSTRACT

Using an alkanolamine titanium chelate catalyst, such as triethanolamine titanium chelate, in small catalytic amounts to esterify and polycondense aromatic polycarboxylic acids or anhydrides, such as terephthalic acid, with a glycol, such as ethylene glycol at low glycol to acid reactant ratios surprisingly yields a polyester of low diethylene glycol content without adding an additional diethylene glycol suppressant.

7 Claims, No Drawings

CATALYTIC PROCESS FOR PREPARATION OF POLYESTERS

BACKGROUND OF THE INVENTION

This invention relates to an improved process for preparing linear condensation polyesters. More particularly, it relates to an improved process for preparing high molecular weight and high quality linear condensation polyesters or copolyesters suitable for processing into fibers, filament, films and other shaped articles as a continuous or discontinuous process.

Linear condensation polyester is prepared by a two-stage process, namely, the first stage of preparing monomeric bis-glycol ester of polycarboxylic acid or its oligomer, and the second stage of subjecting the product to further polycondensation.

Even more particularly, this invention relates to a catalyst for both esterification and polycondensation in the preparation of polyesters.

Many titanium catalysts, including diisopropyl ditriethanolamine ortho-titanate, hereinafter called triethanolamine titanium chelate, (available under the duPont tradename "Tyzor" TE) have been used for esterification. In the direct esterification of terephthalic acid with ethylene glycol it has been necessary in the past to add ether inhibitors along with the catalyst to suppress undesirable side reactions which form diethylene glycol (DEG) which is incorporated as ether linkages in the polymer chains. The presence of ether linkages lowers the melting point of the polymer and makes it more sensitive towards light and heat degradation. The ether inhibitors used are generally basic compounds such as alkyl amines; their use not only involves extra expense but they cause additional processing problems.

SUMMARY OF THE INVENTION

This invention makes possible commercial production of polyesters with low ether contents, without addition of any inhibitor to suppress formation of DEG. Surprisingly, this result is achieved by using the following method to polymerize, in the melt, an aromatic polycarboxylic acid or anhydride with a glycol using titanium compound catalysts to form high molecular weight linear polymers;

(a) esterifying the acid or anhydride with the glycol in the presence of from about 5 ppm Ti to about 100 ppm Ti as an alkanolamine titanium chelate catalyst at a temperature of between about 197° C. and about 300° C. for a period of from about 0.5 hour to about 7 hours at a pressure of between about 0 psig and about 100 psig at a molar ratio of glycol to acid or anhydride of about 1.1:1 to about 3:1, (b) further esterifying and polycondensing the product of step (a) in contact with said catalyst at a temperature of from about 270° C. to about 290° C., under vacuum of from about 0.1 Torr to about 100 Torr for a period of from about 0.5 hour to about 7 hours, while removing the products of condensation, so that the resulting polymer has an intrinsic viscosity between about 0.4 and about 1.2 and contains less than five percent by weight diethylene glycol on the polyester polymer, without adding a diethylene glycol inhibitor.

Preferably, the catalyst is trialkanolamine titanium chelate, more preferably triethanolamine titanium chelate. The preferred acid is terephthalic acid and the preferred glycol is ethylene glycol. Also, step (b) is preferably carried out at less than 10 Torr. The preferred range of catalyst present is between 15 ppm Ti and about 40 ppm Ti at a pressure in step (a) of above 50 psig and the resulting polymer has less than three percent diethylene glycol.

Note that the combination of low glycol to acid reactant ratio with the specific alkanolamine titanium chelate catalyst yields a low ether link (DEG) polymer without any inhibitor or suppressant. See the following examples.

PREFERRED EMBODIMENT

The preferred embodiment of this invention is described in U.S. Pat. No. 3,689,461, hereby incorporated by reference, with the exception of the catalysts and amine inhibitors discussed for that process. Also, the preferred final reactor for this process is disclosed in U.S. Pat. No. 3,976,431, hereby incorporated by reference.

EXAMPLES

Terephthalic acid was reacted with ethylene glycol at various ethylene glycol to terephthalic acid mole ratios to generate the information in the following Table I. The reaction was carried out on bench scale 500 cc glass reactors at atmospheric pressure. The reactants were heated to the boiling point of ethylene glycol, 197° C., and allowed to reflux until the reactants turned from milky to clear indicating enough ester had formed to dissolve the terephthalic acid present. Catalyst concentrations are given in parts per million (ppm) of the weight of only the metal moiety of the catalyst in the reactants. For example, the run A in Table I contained 19.6 g. of terephthalic acid 111.30 g. of ethylene glycol and 0.016 g. of triethanolamine titanium chelate (TET) catalyst. DEG levels were measured by completely hydrolyzing the sample and analyzing the hydrolyzate by gas chromatography. The runs were made with various catalysts, reactant mole ratios and catalyst concentrations. Surprisingly at a 2 mole ratio at a concentration of 72 ppm of Ti as TET there was only 0.7 percent DEG in the product of the reaction, and at 20 ppm Ti as TET only 3.2 percent DEG resulted. On the other hand use of tetraisopropyl titanate (TPT) and antimony triacetate catalyst gave results no better than the control run using no catalyst.

The percent esterification was calculated from the measured acid and saponification numbers of the sample.

The percent DEG in polymer is calculated by assuming that the DEG present in prepolymer will also be present if these samples were converted to high molecular weight polymer, but the volatile components would be absent.

Additional experiments were conducted to make 1.5 kg batches of polyethylene terephthalate in an agitated, electrically heated one gallon batch kettle, capable of going through a pressure and vacuum stage. The vessel was charged with catalyst, terephthalic acid (TPA) and ethylene glycol (EG). No DEG suppressant or inhibitor was used. For this study the EG:TPA ratio was 2:1 for all runs. The pressure cycle was at 75 psig at a temperature rising from 20° C. to 270° C. to create a prepolymer having an intrinsic viscosity (IV) of about 0.1 measured by viscosity of solutions of sample in phenol/tetrachloroethane, 60 weight percent phenol, 40 weight percent tetrachloroethane at 25° C. (see "Techniques of Polymer Characterization", Butterworths, London, 1959 pp. 171-206.) Then the pressure was slowly reduced to about 0.2 Torr and the prepolymer was polycondensed to a high molecular weight at a temperature of 278° C. Results are shown in Table II. COOH means equivalents of carboxyl groups per $10^6$ g. polymer. MP is melting point. Again catalyst is measured as the metal moiety only. Note that the triethanolamine titanium chelate achieves less than half the percent DEG as compared to its analog tetraisopropyl titanate.

The polymer resulting from this method is useful for shaped articles such as fiber, film or molded products.

TABLE I

| Catalyst | Concentration | Run | Mole Ratio | | | | |
|---|---|---|---|---|---|---|---|
| | | | 15 % DEG* | 12 % DEG* | 9 % DEG* | 6 % DEG* | 2 % DEG* |
| TET | 72 ppm Ti | A | 1.3 | 1.3 | 1.4 | 2.8 | 0.7 |
| TET | 20 ppm Ti | B | 2.4 | 2.9 | 4.9 | 5.7 | 3.2 |
| TPT | 20 ppm Ti | C | 5.0 | 5.4 | 8.2 | 11.4 | 5.8 |
| Antimony triacetate | 500 ppm Sb | D | 5.2 | 4.7 | 9.0 | — | — |
| Control | — | E | 4.3 | 6.6 | 8.8 | — | — |
| Time for reactants to become clear (originally milky) | | | time (hrs.) | time | time | time | time |
| | | A | 1.83 | 2.22 | 2.88 | 2.52 | 3.92 |
| | | B | 1.87 | 2.60 | 2.58 | 4.76 | 6.03 |
| | | C | 1.57 | — | 2.18 | 4.28 | 5.17 |
| | | D | 1.33 | 1.72 | 2.63 | — | — |
| | | E | 1.43 | 2.30 | 2.63 | — | — |
| calculated % esterification | | | % est. | % est. | % est. | % est. | % est. |
| | | A | 72.2 | 74.0 | 78.8 | 85.4 | 92.5 |
| | | B | 76.3 | 74.3 | 77.3 | 86.2 | 96.2 |
| | | C | 76.5 | 74.0 | 78.5 | 85.3 | 97.2 |
| | | D | 72.8 | 74.6 | 78.8 | — | — |
| | | E | 70.9 | 74.7 | 79.7 | — | — |
| calculated % DEG in polymer | | | % DEG | % DEG | % DEG | % DEG | % DEG |
| | | A | 7.0 | 5.8 | 5.1 | 7.3 | 1.0 |
| | | B | 12.8 | 12.6 | 16.7 | 14.6 | 4.4 |
| | | C | 25.1 | 22.9 | 26.9 | 27.3 | 8.0 |
| | | D | 26.0 | 20.2 | 29.0 | —. | — |
| | | E | 21.9 | 27.1 | 28.4 | — | — |

*% in prepolymer products of reaction.

TABLE II

| Run | Catalyst | Level (ppm) Calculated | Level (ppm) Found | IV | COOH | DEG % | MP (°C.) | Vacuum Time (hr.) |
|---|---|---|---|---|---|---|---|---|
| F | Triethanol amine Titanium chelate | 20 Ti | 16 | 0.97 | 25 | 2.3 | 246 | 1.5 |
| G | Triethanol amine Titanium chelate | 20 | 15 | 1.17 | 24 | 2.2 | 252 | 1.5 |
| H | Tetraisopropyl Titanate | 20 | 13 | 1.01 | 21 | 5.6 | 238 | 1.5 |
| I | Antimony Acetate | 295 Sb | — | 0.85 | 32 | 6.3 | 238 | 1.9 |
| J | Antimony Acetate | 295 | 255 | 0.85 | 27 | 6.3 | 241 | 2.0 |

What is claimed is:

1. In the method of polymerization, in the melt, of an aromatic polycarboxylic acid or anhydride with a glycol using titanium compound catalysts to form high molecular weight linear polymers, the improvement comprising
    (a) esterifying the acid or anhydride with the glycol in the pressure of from about 5 ppm of Ti to about 100 ppm of Ti as an alkanolamine titanium chelate catalyst at a temperature of between about 197° C. and about 300° C. for a period of from about 0.5 hour to about 7 hours at a pressure of between about 0 psig and about 100 psig at a molar ratio of glycol to acid or anhydride of about 1.1:1 to about 3:1,
    (b) further esterifying and polycondensing the product of step (a) in contact with said catalyst at a temperature of from about 270° C. to about 290° C., under vacuum of from about 0.1 Torr to about 100 Torr for a period of from about 0.5 hour to about 7 hours, while removing the products of condensation, so that the resulting polymer has an intrinsic viscosity between about 0.4 and about 1.2 and contains less than 5 percent by weight diethylene glycol, without adding a diethylene glycol inhibitor.

2. The method of claim 1 wherein said catalyst is a trialkanolamine titanium chelate.

3. The method of claim 2 wherein said acid is terephthalic acid and said glycol is ethylene glycol.

4. The method of claim 2 wherein said catalyst is triethanolamine titanium chelate.

5. The method of claim 4 wherein said acid is terephthalic acid and said glycol is ethylene glycol.

6. The method of claim 5 wherein said step (b) is carried out at less than 10 Torr.

7. The method of claim 4 wherein said catalyst is present in an amount from about 15 ppm Ti to about 40 ppm Ti, the pressure of step (a) is above 50 psig and the resulting polymer has less than three percent by weight of polymer of diethylene glycol.

* * * * *

UNITED STATES PATENT AND TRADEMARK OFFICE
CERTIFICATE OF CORRECTION

PATENT NO. : U.S. 4,260,735
DATED : April 7, 1981
INVENTOR(S) : John A. Bander, Stanley D. Lazarus & Ian C. Twilley It is certified that error appears in the above-identified patent and that said Letters Patent are hereby corrected as shown below:

Claim 1, Column 3, Line 68, third word, "pressure" should read --presence--.

Signed and Sealed this

*Twenty-third* Day of *June 1981*

[SEAL]

*Attest:*

RENE D. TEGTMEYER

*Attesting Officer*   *Acting Commissioner of Patents and Trademarks*